(12) United States Patent
Yamashita et al.

(10) Patent No.: US 8,928,829 B2
(45) Date of Patent: Jan. 6, 2015

(54) DISPLAY DEVICE

(71) Applicant: Innolux Corporation, Miao-Li County (TW)

(72) Inventors: Keitaro Yamashita, Miao-Li County (TW); Minoru Shibazaki, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 53 days.

(21) Appl. No.: 13/906,569

(22) Filed: May 31, 2013

(65) Prior Publication Data

US 2014/0354911 A1    Dec. 4, 2014

(51) Int. Cl.
*G02F 1/136* (2006.01)
*G02F 1/1362* (2006.01)

(52) U.S. Cl.
CPC  *G02F 1/136286* (2013.01); *G02F 2001/13606* (2013.01)
USPC .......................................................... 349/43

(58) Field of Classification Search
USPC .......................................................... 349/43
See application file for complete search history.

(56) References Cited

U.S. PATENT DOCUMENTS 8,174,633 B2    5/2012  Segawa et al.

*Primary Examiner* — Phu Vu
(74) *Attorney, Agent, or Firm* — McClure, Qualey & Rodack, LLP

(57) ABSTRACT

A display device comprising a first substrate, a second substrate opposite to the first substrate and a pixel array is disclosed. The pixel array is disposed on the first substrate and comprises a plurality of pixels. Each pixel comprises a first conductive layer, a semiconductor layer, an electrode layer and a scan line. The first conductive layer is on the first substrate for receiving pixel data signals to the pixels. The electrode layer is disposed between the first and the second substrates. The semiconductor layer is between the first conductive layer and the electrode layer, and has first and second ends. The first end is directly connected to the first conductive layer, and the second end is electrically connected to the electrode layer. The scan line is on the semiconductor layer for receiving a plurality of scan signals to the pixels.

9 Claims, 8 Drawing Sheets

DISPLAY DEVICE

BACKGROUND

1. Field of the Invention

The invention relates in general to a display device, and more particularly to a lower power display device.

2. Description of the Related Art

A display panel of a liquid crystal display (LCD) device comprises a plurality of scan lines and a plurality of data lines across each other to form an active area. A pixel electrode and thin film transistors are formed in the active area. A scan driver and a data driver respectively provide scan signals and data signals to the scan lines and the data lines.

FIG. 1A shows a block diagram of the LCD 10 with a plurality of pixels 11 arranged on intersection of data lines 13 and scan lines 14, forming an array 12. Each data line 13 is coupled with the data driver 15 to transfer display image data from the data driver 15 to be input to pixels 11 arranged on the scan line 14 by synchronously scanning a scan driver 16.

FIG. 1B shows a pixel structure of the pixel 11 and FIG. 1C shows a cross-section of the cutting line indicated I-J of FIG. 1B. The common electrode 20 is perpendicularly arranged on the data line 13. The common electrode 20 and the data line 13 form a parasitic capacitor 21.

The product of resistance R and capacitor C is related to a time constant RC of a signal transmitted by the data line 13. This becomes a more critical issue in a display industry, especially for a higher resolution display, because the time constant RC is associated with the delay time. In order to improve the problem of the delay time caused by RC delay effect, either the resistance R or the capacitor C should be reduced.

In one aspect, the display image data transferred along with data line 13 has high frequency corresponding to the display resolution (row number) and frame frequency. The charging and discharging of the parasitic capacitor 21 induces energy consumption in the data driver. Namely this panel consumes power proportional to the frame frequency. It is in fact that this power consumption is a great part of panel power consumption. Therefore, rescuing the parasitic capacitor 21 results in reducing panel power consumption.

Another aspect of reducing the parasitic capacitor is to reducing the time constant RC associated with resistance R. Low RC on the data line 13 makes faster charge and discharge which is necessary for high resolution display. Display used in a mobile electronics such as mobile phone, low power consumption is one of the most essential feature so as to extend the battery life whilst the display goes to higher resolution.

SUMMARY

The invention is directed to a display device, the display device has a conductive layer disposed on a substrate for reducing the power consumption of the display device.

According to an aspect of the present invention, a display device comprising a first substrate, a second substrate opposite to the first substrate, and a pixel array is disclosed. The pixel array is disposed on the first substrate and comprises a plurality of pixels. Each pixel comprises a first conductive layer, a semiconductor layer, an electrode layer, and a scan line, the first conductive layer is on the first substrate for receiving pixel data signals to the pixels. The electrode layer is disposed between the first substrate and the second substrate. The semiconductor layer is between the first conductive layer and the electrode layer, and has first and second ends. The first end is directly connected to the first conductive layer, and the second end is electrically connected to the electrode layer. The scan line is on the semiconductor layer for receiving a plurality of scan signals to the pixel.

The above and other aspects of the invention will become better understood with regard to the following detailed description of the preferred but non-limiting embodiment(s). The following description is made with reference to the accompanying drawings.

DETAILED DESCRIPTION

First Embodiment

Figure 1A:
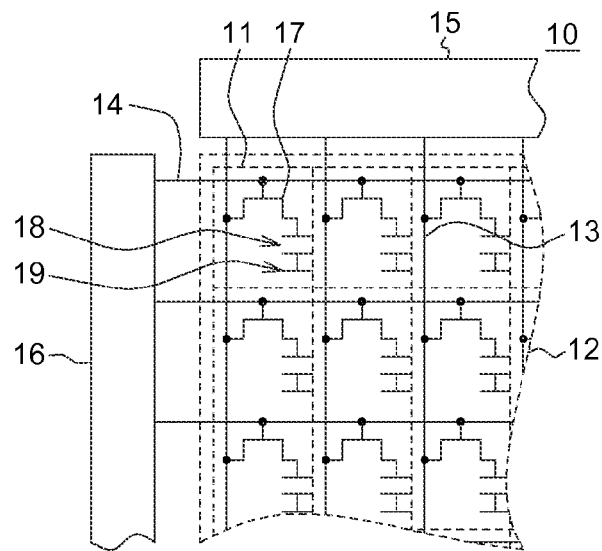
FIG. 1A shows a block diagram of the LCD with a plurality of pixels arranged on intersection of data lines and scan lines for forming an array according to a prior art.
Figure 1B:
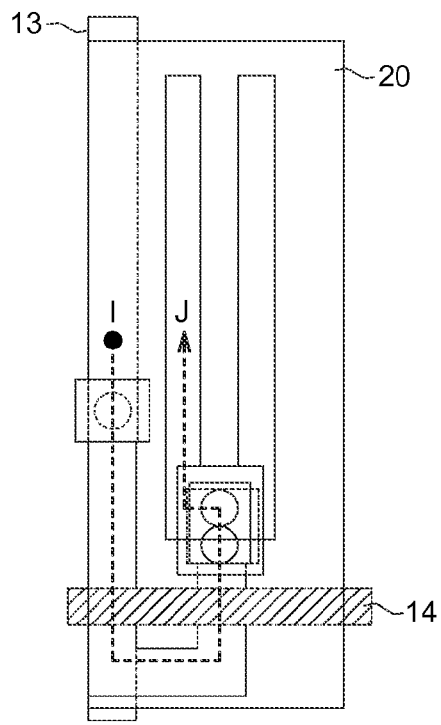
FIG. 1B shows a diagram of a pixel structure of the pixel according to a prior art.
Figure 1C:
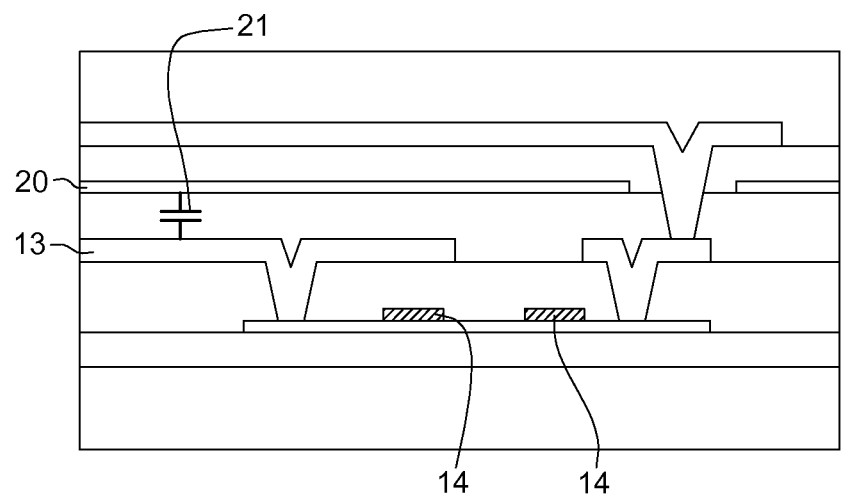
FIG. 1C shows a cross-section view of the cutting line indicated by I-J of FIG. 1B according to a prior art.
Figure 2A:
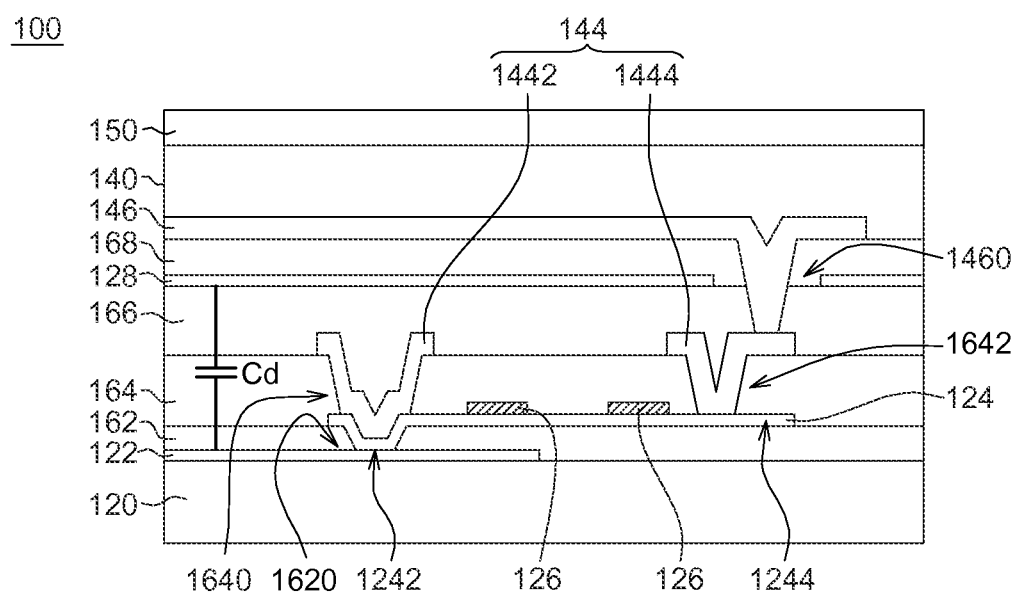
FIG. 2A illustrates a cross section view of a pixel in a display device according to an embodiment of the invention.

FIG. 2A illustrates a cross section view of a pixel in a display device 100 according to an embodiment of the invention. Referring to FIG. 2A, the display device 100 comprises a first substrate 120, a second substrate 150 opposite to the first substrate 120. A pixel array (not illustrated) comprises a plurality of pixels disposed on the first substrate 120.

The pixel comprises a plurality of layers. A first conductive layer 122, for being a data line, disposed on the first substrate 120. An insulating layer 162 is disposed on the first conductive layer. A semiconductor layer 124 is disposed on the insulating layer 162 and covers the contact hole 1620. The semiconductor layer 124 comprises a first end and a second end. A scan line 126 is disposed on the semiconductor layer 124. In one embodiment, the scan line 126 can be disposed on either the upper surface of the semiconductor layer 124, or on the lower surface of the semiconductor layer 124.

An insulating layer 164 is disposed on the insulating layer 162, the scan line 126 and the semiconductor layer 124. The contact hole 1640 and the contact hole 1642 penetrate the insulating layer 164. The first end 1242 of the semiconductor layer 124 covers the contact hole 1620 and directly connected to the first conductive layer 122. A scan line 144 has a first part 1442 and a second part 1444. The first part 1442 is disposed on the contact hole 1640, and the second part 1444 is disposed on the contact hole 1642. The second end 1244 of the semiconductor layer 124 is electrically connected to the second part 1444 of the second conductive layer 144 through the contact hole 1642, and the second end 1244 is further electrically connected to the electrode layer 146 (such as the pixel electrode) through the second part 1444 of the second conductive layer 144.

A dielectric layer 166 is disposed on the insulating layer 164 and the second conductive layer 144. A common electrode 128 is disposed on the dielectric layer 166. An insulating layer 168 is disposed on the common electrode 128. A contact hole 1460 penetrates the insulating layer 168 and a part of the dielectric layer 166 to contact the second part 1444 of the second conductive layer 144. An electrode layer 146 is disposed on the insulating layer 168 and covers the contact hole 1460. A liquid crystal layer 140 is disposed between the first substrate 120 and the second substrate 150.

In one embodiment, the display device further comprises the second substrate, including but not limited into, a counter common electrode (not illustrated) disposed on the second substrate 150.

In one embodiment, the semiconductor layer 124 can be implemented and can comprise an amorphous-silicon, oxide, indium-gallium-zinc oxide, low temperature-poly-silicon, organic, or carbon nano-tube.

Figure 2B:
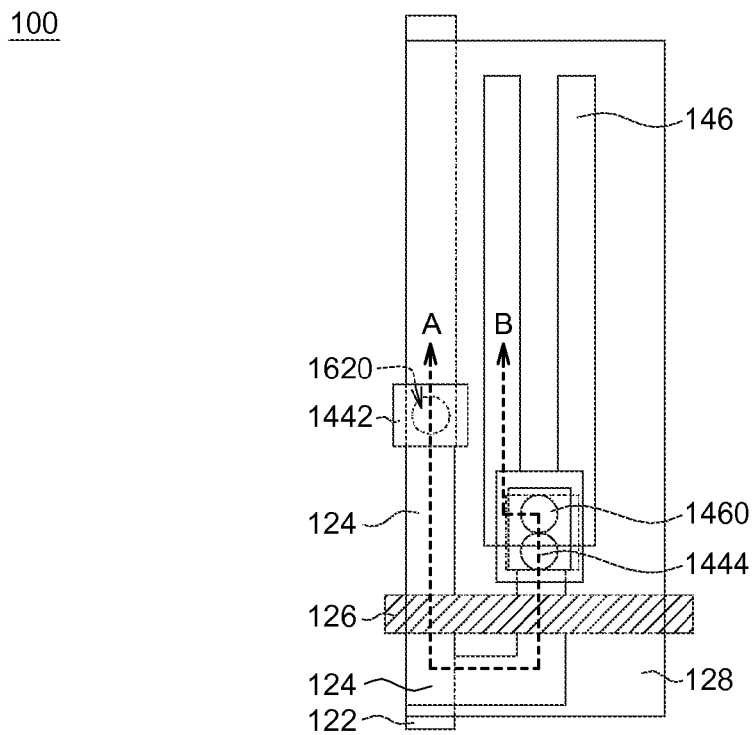
FIG. 2B illustrates a top view of a pixel of a display device in an embodiment of the invention.

FIG. 2B illustrates a top view of a pixel of a display device 100 in an embodiment of the invention. The same elements in the pixel of the display device are represented by the same reference numbers. The cross section view of the pixel of the display device in FIG. 2A is cross sectioned by cross section line A-B in FIG. 2B.

According to the first embodiment, the interlayer distance between the common electrode 128 and the first conductor 122 is more distant that the interlayer distance between the common electrode 128 and the second conductive layer 144. Namely, the data line capacitance Cd. produced by the interlayer distance in the first embodiment is comparably smaller than that of the prior art. That is to say the panel power consumption of the first embodiment is smaller than the display with the prior art.

According to the first embodiment, the reducing data line capacitance reduces the time constant in other words. This contributes to make higher resolution display or drive display with higher frame frequency.

Second Embodiment

Figure 3A:
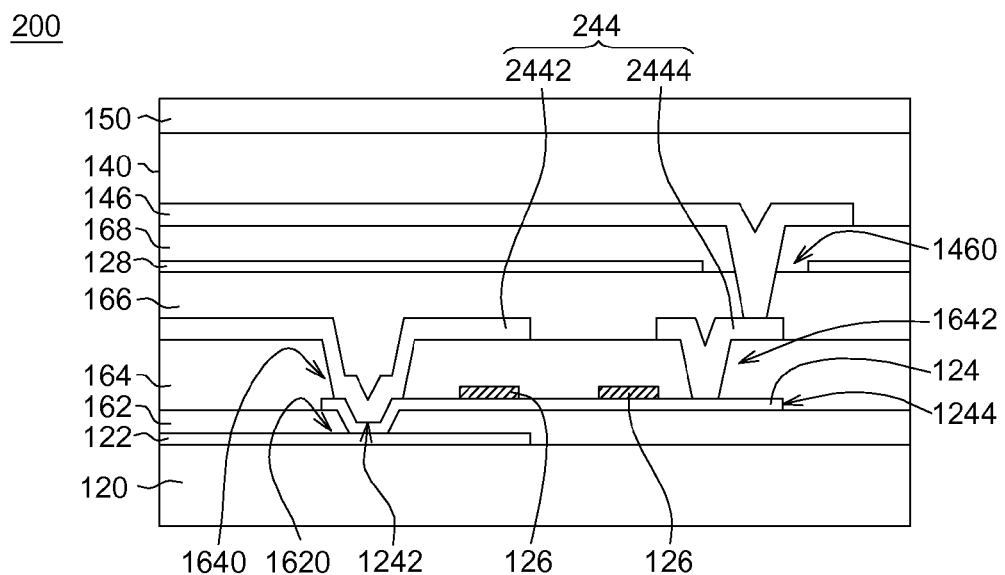
FIG. 3A illustrates a cross section view of a pixel in a display device according to an embodiment of the invention.

FIG. 3A illustrates a cross section view of a pixel in a display device 200 according to an embodiment of the invention. Referring to FIG. 3A, the display device 200 is similar to the display device 100 in FIG. 2A. The same elements are represented by the same reference numbers, and the similarities are not repeated herein.

The differences between the display device 200 and the display device 100 are that the display device 200 has a second conductive layer 244. The second conductive layer 244 comprises a first part 2442 and a second part 2444. The first part 2442 of the second conductive layer 244 and the first conductive layer 122 are arranged in parallel, electrically connected, and are performed as a data line. Therefore, the resistance of the data line can be reduced. Both the first part 2442 of the second conductive layer 244 and the first conductive layer 122 receive and transfer a plurality of pixel data signals to the pixels.

Figure 3B:
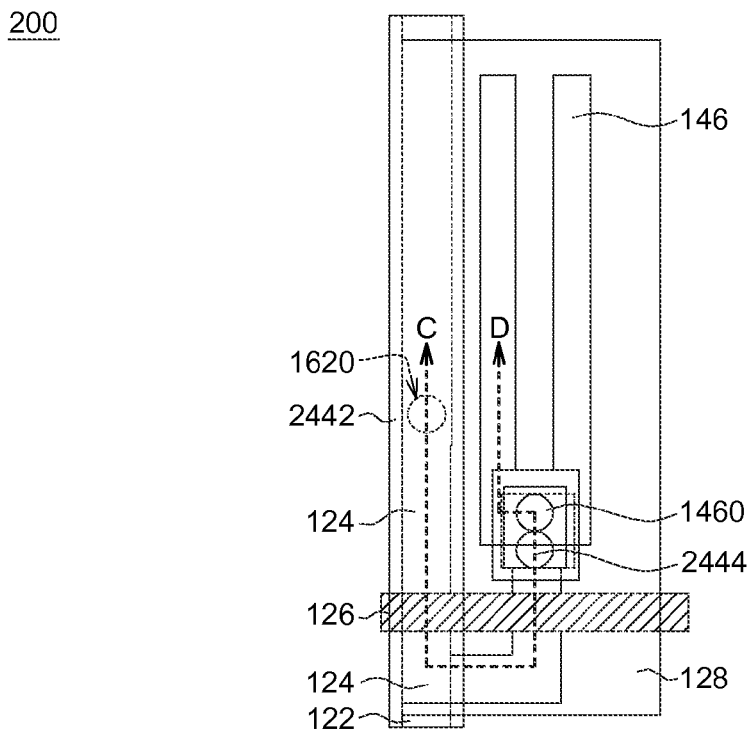
FIG. 3B illustrates a top view of a pixel of a display device in an embodiment of the invention.

FIG. 3B illustrates a top view of a pixel of a display device 200 in an embodiment of the invention. The same elements in the pixel of the display device are represented by the same reference numbers. The cross section view of the pixel of the display device in FIG. 3B is cross sectioned by cross section line C-D.

Third Embodiment

Figure 4A:
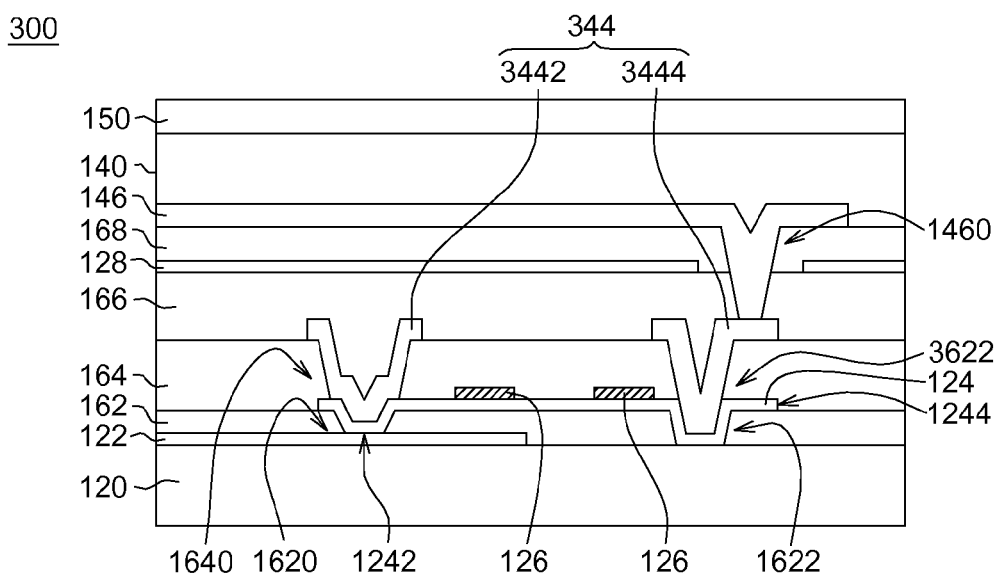
FIG. 4A illustrates a cross section view of a pixel in a display device according to an embodiment of the invention.

FIG. 4A illustrates a cross section view of a pixel in a display device 300 according to an embodiment of the invention. Referring to FIG. 4A, the display device 300 is similar to the display device 100 in FIG. 2A. The same elements are represented by the same reference numbers, and the similarities are not repeated herein.

The differences between the display device 300 and the display device 100 are that the display device 300 has another contact hole 3622 and contact hole 1622 pass through the insulating layer 162. The semiconductor layer 124 covers the contact hole 3622. The second conductive layer 344 has a first part 3442 and a second part 3444. The first part 3442 of the second conductive layer 344 is electrically connected to the first conductive layer 122 through the contact hole 1640 by the semiconductor layer 124. The second part 3444 of the second conductive layer 344 is electrically connected to the second end 1244 of the semiconductor layer through the another contact hole 3622. The contact hole 1620 and the contact hole 3622 can be formed by the same mask process. The first end 1242 and the second end of 1244 the semiconductor layer 124 can be respectively formed on the contact hole 1620 and the contact hole 1622. Then, the first part 3442 and the second part 3444 of the second conductive layer 344 can be formed on the first end 1242 and the second end 1244 of the semiconductor layer 124.

Figure 4B:
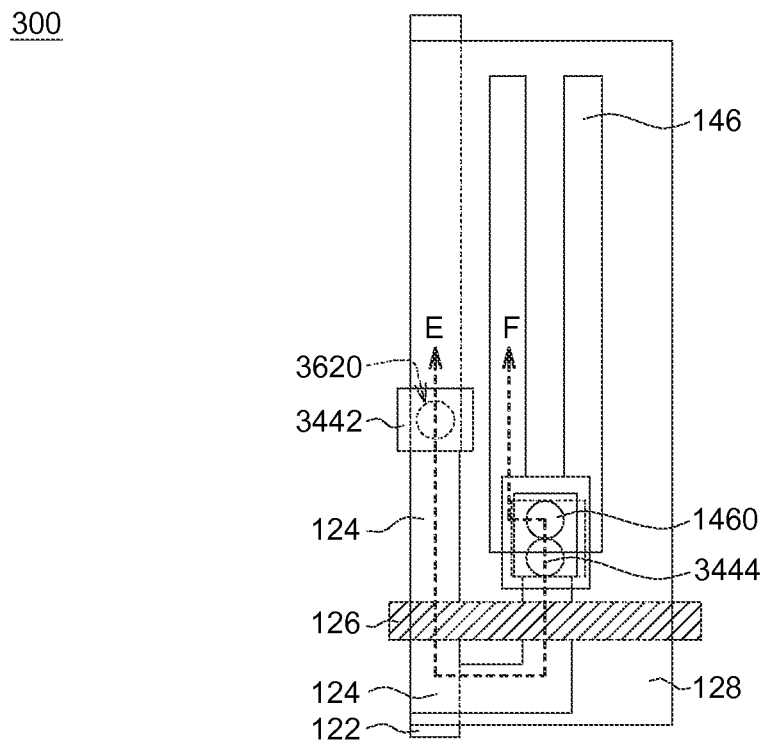
FIG. 4B illustrates a top view of a pixel of a display device in an embodiment of the invention.

FIG. 4B illustrates a top view of a pixel of a display device 300 in an embodiment of the invention. The same elements in the pixel of the display device are represented by the same reference numbers. The cross section view of the pixel of the display device in FIG. 4B is cross sectioned by cross section line E-F.

Fourth Embodiment

Figure 5A:
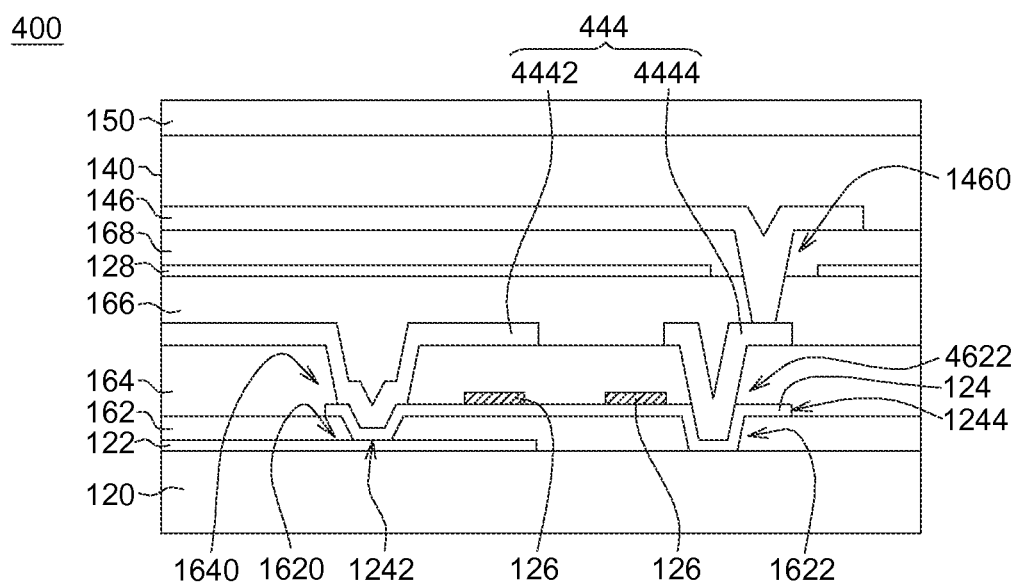
FIG. 5A illustrates a cross section view of a pixel in a display device according to an embodiment of the invention.

FIG. 5A illustrates a cross section view of a pixel in a display device 400 according to an embodiment of the invention. Referring to FIG. 5A, the display device 400 is similar to the display device 200 in FIG. 3A. The same elements are represented by the same reference numbers, and the similarities are not repeated herein.

The differences between the display device 400 and the display device 200 are that the display device 400 has another contact hole 4622 passes through the insulating layer 162. The semiconductor layer 124 covers the contact hole 4622. The second conductive layer 444 has a first part 4442 and a second part 4444. The first part 4442 of the second conductive layer 444 is electrically connected to the first conductive layer 122 through the contact hole 1620 by the semiconductor layer 124. The second part 4444 of the second conductive layer 444 is electrically connected to the second end 1244 of the semiconductor layer 124 through the another contact hole 4622. The contact hole 1620 and the contact hole 4622 can be formed by the same mask process. The first end and the second end of the semiconductor layer 124 can be respectively formed on the contact hole 1620 and the contact hole 4622. Then, the first part 4442 and the second part 4444 of the second conductive layer 444 can be formed on the first end 1242 and the second end 1244 of the semiconductor layer 124.

Figure 5B:
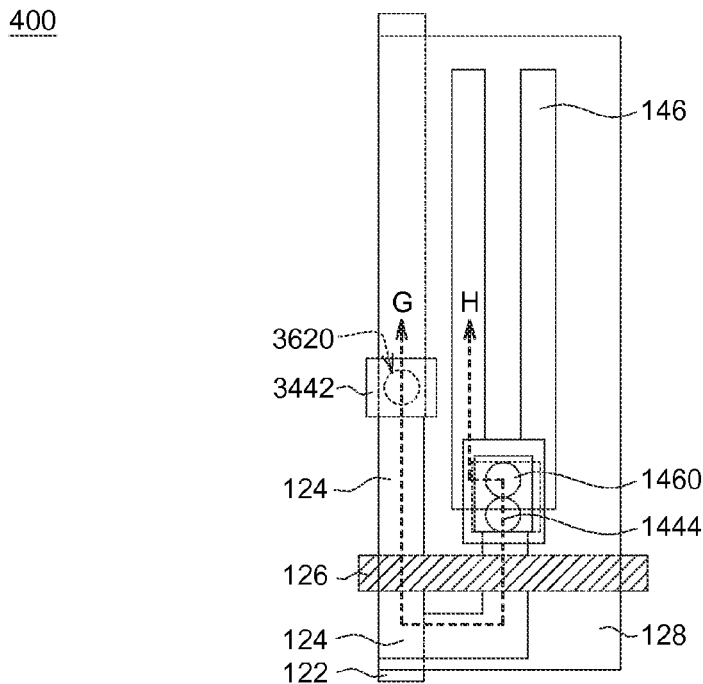
FIG. 5B illustrates a top view of a pixel of a display device in an embodiment of the invention.

FIG. 5B illustrates a top view of a pixel of a display device 400 in an embodiment of the invention. The same elements in the pixel of the display device are represented by the same reference numbers. The cross section view of the pixel of the display device in FIG. 5B is cross sectioned by cross section line G-H.

Fifth Embodiment

Figure 6A:
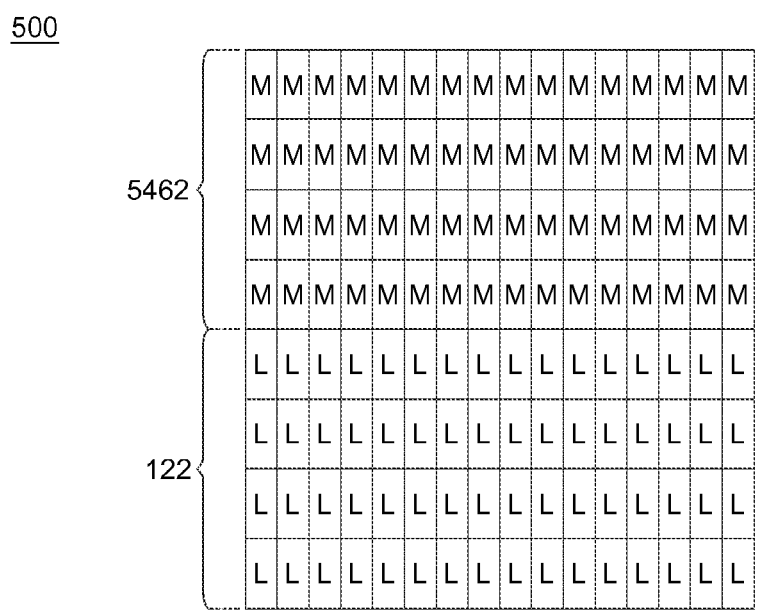
FIG. 6A illustrates one driving method for the display device according to an embodiment of the invention.
Figure 6B:
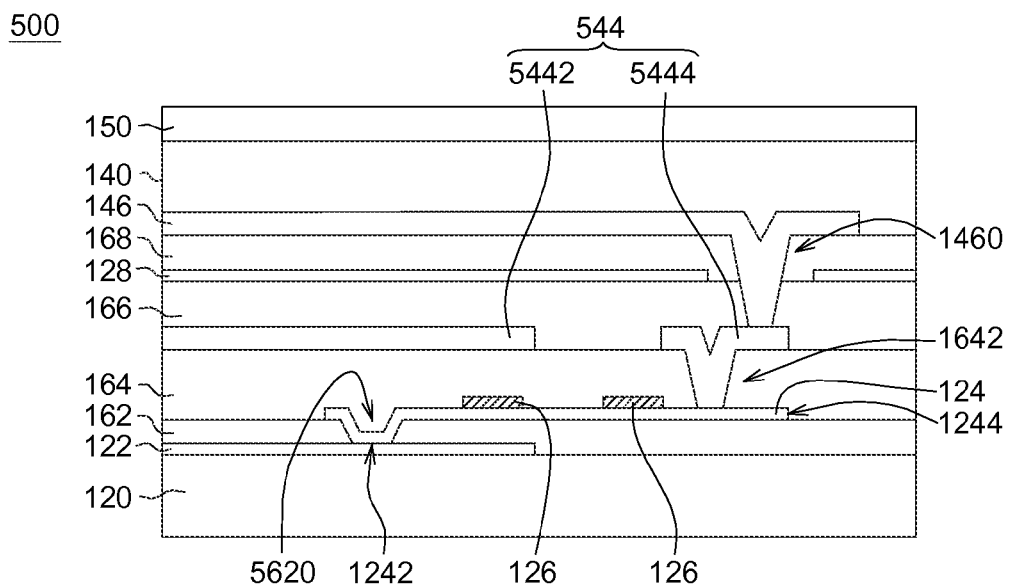
FIG. 6B illustrates a cross section view of a pixel in a first region of a display device according to an embodiment of the invention.
Figure 6C:
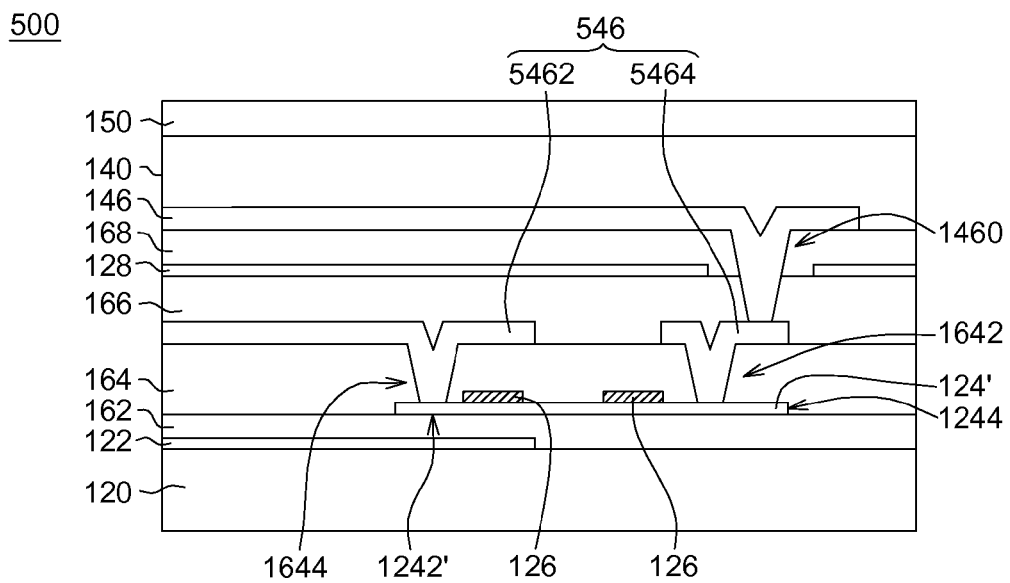
FIG. 6C illustrates a cross section view of a pixel in a second region of the display device.

FIG. 6A illustrates one driving method for the display device 500 according to an embodiment of the invention. FIG. 6B illustrates a first region of the display device 500 according to an embodiment of the invention. FIG. 6C illustrates a second region of the display device 500. In other, the display device 500 can comprise structures of a first region (shown in FIG. 6B) and a second region (shown in FIG. 6C). For the convenience of description, some of the elements of the display device 500 are omitted in FIG. 6A.

Referring to FIG. 6A, the data signals M and the data signals L can be transferred to the first part 5462 of the second conductive layer 546 (shown in FIG. 6C) and the first conductive layer 122 respectively at a same time. The first conductive layer 122 is not electrically connected to the first part 5462 of second conductive layer 546. In particular, the upper rows in the pixel array, denoted with M in FIG. 6A, can receive the data signal M by the first part 5462 of the second conductive layer 546. The lower rows in the pixel array, denoted with L in FIG. 6A can receive the data signal L by the first conductive layer 122.

In this embodiment, the display device has an advantage of driving two rows of pixels in the pixel array (respectively at an upper portion of the active area and at a lower portion of the active area) simultaneously. Therefore, the display image of the display device can be refreshed two times faster than that of a conventional display, and the image motion quality of the display device can be improved.

The data lines from driver IC (not shown) coupled to the first part 5462 of the second conductive layer 546 and the first conductive layer 122 are driven simultaneously, thereby enabling the double number of analogue data transferred at the same time. Since each of data lines can be driven simultaneously, the entire display refresh rate becomes two times faster (120 Hz) than the 60 Hz of conventional display. Therefore, the display device can be driven in a double frequency (such as 120 Hz).

In one embodiment, the display device can be a touch sensitive display device having a touch sensor, and the display device capable of being driven in a double frequency (such as 120 Hz) can be driven in a normal frequency (such as 60 Hz) interlacing with a marginal blanking period for a touch sensitive driving.

In one embodiment, two independent gate driver units (not shown) can be arranged for connecting to gate lines at the upper rows and the lower rows of the pixels, and the gate lines for driving the upper rows and the lower rows of the pixels in the pixel array can be driven simultaneously.

Figures 6D, 6E:
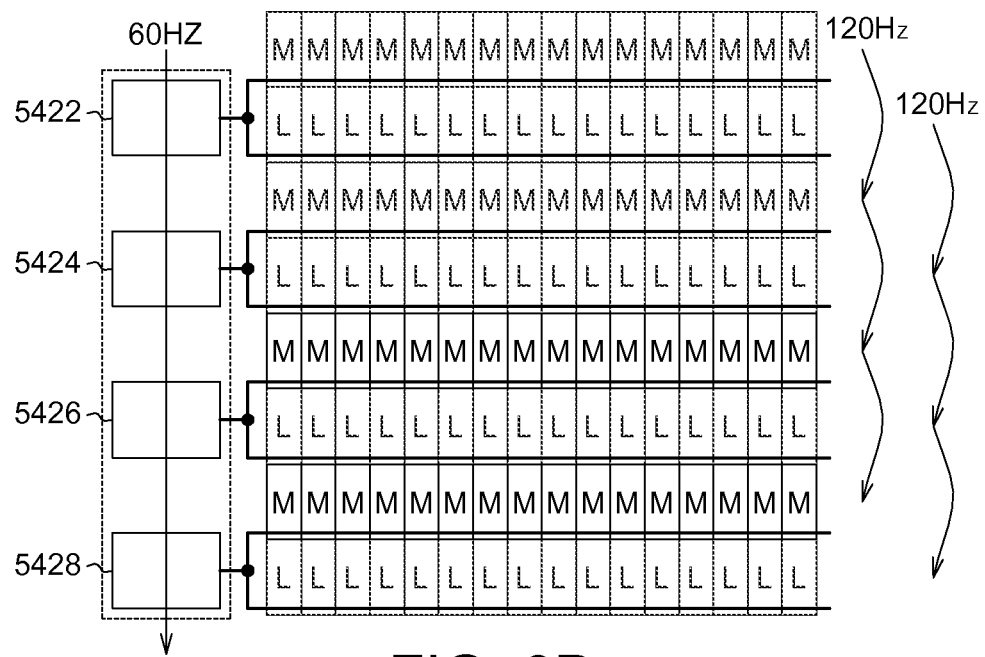
FIG. 6D illustrates another one driving method for the display device according to an embodiment of the invention.
FIG. 6E illustrates still another one driving method for the display device according to an embodiment of the invention.

FIG. 6D illustrates another one driving method for the display device 500 according to an embodiment of the invention. Similar to the driving method in FIG. 6A, the data signals M and the data signals L can be transferred to the first part 5462 of the second conductive layer 546 and the first conductive layer 122 respectively at a same time. The first conductive layer 122 is not electrically connected to the first part 5462 of the second conductive layer 546. The difference is that the first part 5462 of the second conductive layer 546 and the first conductive layer 122 are interdigitated row by row and respectively connected to the scan line 5422, the scan line 5424, the scan line 5426 and the scan line 5428. In this case, the rows in the pixel array to be driven at the same time can be a row ($n^{th}$) and its adjacent row (($n+1)^{th}$) row. By such arrangement, the images can be refreshed two times faster. Therefore, the unit number of gate driver can be reduced to achieve a thinner display device. The upper rows in the pixel array can receive the data signal M by the first part 5462 of the second conductive layer 546. Therefore, the display device can be driven in a double frequency (such as 120 Hz), which is two time faster than the driven frequency (such as 60 Hz) of a convention display device. In one embodiment, the display device can be a touch sensitive display device to be driven in a normal frequency, and this driving method can provide a marginal blanking period for a touch sensitive driving.

FIG. 6E illustrates another one driving method for the display device 500 according to an embodiment of the invention. As shown in FIG. 6E, the pixels arranged in odd rows and even rows are corresponding to the first region and the second region, respectively. In another embodiment, the pixels arranged in odd rows and even rows are corresponding to the second region and the first region, respectively. The pixels in the pixel array, denoted with M in FIG. 6E, can receive the data signal M by the first part 5462 of the second conductive layer 546. The pixels in the pixel array, denoted with L in FIG. 6E can receive the data signal L by the first conductive layer 122.

Based on the above, the display devices according to the embodiments of the invention have a first conductive layer disposed on the first substrate, for receiving a plurality of pixel data to the pixels. The disposition of first conductive layer can reduce the capacitance or the resistance of the data line, or improve the scanning frequency. Generally speaking, the panel driving power consumption is proportional to the capacitance value of the data (source) line. Therefore, the reduction of the data line capacitance can lead to the reduction of power consumption. Thereby, the embodiments of the invention enable longer battery life for mobile display devices or reduce battery weight.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprising:
    a first substrate;
    a second substrate opposite to the first substrate;
    a pixel array disposed on the first substrate, the pixel array comprising a plurality of pixels, each of the pixels comprising:
        a first conductive layer, disposed on the first substrate, for receiving a plurality of pixel data signals to the pixels;
        an electrode layer, disposed between the first substrate and the second substrate;
        a semiconductor layer, disposed between the first conductive layer and the electrode layer, and having a first end and a second end, the first end of the semiconductor layer directly connected to the first conductive layer, and the second end of the semiconductor layer electrically connected to the electrode layer;

a scan line, disposed on the semiconductor layer, for receiving a plurality of scan signals to the pixel.

2. The display device according to claim 1, further comprising a second conductive layer, disposed upon the semiconductor layer, wherein the second conductive layer comprises a first part and a second part, the first part and the second part are separated by a dielectric layer, the first part is connected to the first conductive layer through the first end of semiconductor layer, and the second end of semiconductor layer is connected to the electrode layer through the second part of the second conductive layer.

3. The display device according to claim 2, wherein the first conductive layer and the first part of the second conductive layer are parallelly arranged and electrically connected for receiving a plurality of pixel data signals to the pixel.

4. The display device according to claim 2, wherein the display device has a first region and a second region, the first end of the semiconductor layer coupled to the first conductive layer is for receiving a plurality of pixel data signals to the pixel in the first region, and the first end of the semiconductor layer coupled to the first part of the second conductive layer is for receiving a plurality of pixel data signals to the pixel in the second region, wherein the first conductive layer is not electrically connected to the first part of the second conductive layer.

5. The display device according to claim 4, wherein the pixels arranged in odd rows correspond to the first region, and the pixels arranged in even rows correspond to the second region.

6. The display device according to claim 4, wherein the pixels arranged in even rows correspond to the first region, and the pixels arranged in odd rows correspond to the second region.

7. The display device according to claim 1, wherein the display device further comprises a common electrode disposed on the second substrate.

8. The display device according to claim 1, wherein the second substrate is a color filter glass, and a liquid crystal layer is disposed between the first substrate and the second substrate.

9. The display device according to claim 1, wherein the semiconductor layer comprises an amorphous-silicon, oxide, indium-gallium-zinc oxide, low temperature-poly-silicon, organic, or carbon nano-tube.

* * * * *